(12) United States Patent
Reader

(10) Patent No.: US 12,347,073 B2
(45) Date of Patent: Jul. 1, 2025

(54) IMAGE RECONSTRUCTION

(71) Applicant: KING'S COLLEGE LONDON, London (GB)

(72) Inventor: Andrew J. Reader, London (GB)

(73) Assignee: KING'S COLLEGE LONDON, London (GB)

( * ) Notice: Subject to any disclaimer, the term of this patent is extended or adjusted under 35 U.S.C. 154(b) by 162 days.

(21) Appl. No.: 17/601,135

(22) PCT Filed: Apr. 2, 2020

(86) PCT No.: PCT/GB2020/050876
§ 371 (c)(1),
(2) Date: Oct. 4, 2021

(87) PCT Pub. No.: WO2020/201755
PCT Pub. Date: Oct. 8, 2020

(65) Prior Publication Data
US 2022/0172328 A1 Jun. 2, 2022

(30) Foreign Application Priority Data
Apr. 3, 2019 (GB) .................................... 1904678

(51) Int. Cl.
*G06T 5/70* (2024.01)
*H04N 5/21* (2006.01)

(52) U.S. Cl.
CPC .............. *G06T 5/70* (2024.01); *H04N 5/21* (2013.01); *G06T 2207/10104* (2013.01); *G06T 2207/30004* (2013.01)

(58) Field of Classification Search
CPC . G06T 5/002; G06T 5/50; G06T 2207/10104; G06T 2207/30004;
(Continued)

(56) References Cited

U.S. PATENT DOCUMENTS 9,569,736 B1 * 2/2017 Ghesu ................... G06N 20/00
10,096,107 B2 * 10/2018 Ghesu .................. A61B 8/4416
(Continued)

FOREIGN PATENT DOCUMENTS

CN  102270350     12/2011
JP  2015-123302    7/2015
WO  2013/088294 A1  6/2013

OTHER PUBLICATIONS

Yan et al. "Modeling of polychromatic attenuation using computed tomography reconstructed images" Med. Phys. 26(4) Apr. 1999.
(Continued)

*Primary Examiner* — John W Miller
*Assistant Examiner* — Sean N. Haiem
(74) *Attorney, Agent, or Firm* — Stuart H. Mayer; Kaplan Breyer Schwarz LLP

(57) ABSTRACT

A method of creating an image representative of a measured dataset by iteratively updating a base image includes: generating a principal dataset from the measured dataset, the principal dataset having noise at substantially the same level as the measured dataset; generating an additional dataset from the measured dataset such that the additional dataset has noise at substantially the same level as the measured dataset and is not identical to the principal dataset; processing the base image without noise compensation using the principal dataset and additional dataset to obtain a principal interim image and an additional interim image; comparing the principal and the additional interim image to determine an indication of a noise level present; and using the determined indication of noise present to select noise compensation to apply when processing the base image using the measured dataset to create a new base image representative of the measured dataset.

7 Claims, 4 Drawing Sheets

(58) Field of Classification Search
CPC .......... H04N 5/21; H04N 23/81; H04N 23/25; H04N 23/60; H04N 23/67
USPC ........................................................ 348/607
See application file for complete search history.

(56) References Cited

U.S. PATENT DOCUMENTS

| | | | | |
|---|---|---|---|---|
| 2003/0076988 | A1* | 4/2003 | Liang | G06T 5/002 382/131 |
| 2006/0269130 | A1* | 11/2006 | Maroy | G06T 7/215 382/128 |
| 2010/0183225 | A1* | 7/2010 | Vantaram | G06T 7/11 382/173 |
| 2017/0091963 | A1* | 3/2017 | Panin | A61B 6/5264 |
| 2017/0103532 | A1* | 4/2017 | Ghesu | A61B 5/7264 |
| 2017/0249735 | A1* | 8/2017 | Feng | G06T 7/0012 |

OTHER PUBLICATIONS

Zhang et al. "Regularization parameter selection for penalized-likelihood list-mode image reconstruction in PET" Phys. Med. Biol. 62 (2017) 5114.

Peng, et al. "Optimal Regularization Parameter Selection for Constrained Reconstruction Using Deep Learning" Proc. Intl. Soc. Mag. Reson. Med. 26 (2018).

A. R. De Pierro (1995) A Modified Expectation Maximization Algorithm for Penalized Likelihood Estimation in Emission Tomography, IEEE Trans. Med. Imaging, vol. 14, No. 1, pp. 132-137.

J. E. Bowsher et al (2004) Utilizing MRI Information to Estimate F18-FDG Distributions in Rat Flank Tumors, IEEE Nucl. Sci. Symp. Conf. Rec., vol. 4, 2004, pp. 2488-2492.

Coakley, K. J. (1991), A cross-validation procedure for stopping the EM algorithm and deconvolution of neutron depth profiling spectra IEEE Transactions on Nuclear Science vol. 38, Issue: 1.

Coakley, K. J. (1996), Bootstrap method for nonlinear filtering of EM-ML reconstructions of PET images. Int. J. Imaging Syst. Technol., 7: 54-61. doi:10.1002/(SICI)1098 1098(199621)7:1<54::AID-IMA7>3.0.CO;2-T.

Zhang et al (2017) Regularization parameter selection for penalized-likelihood list-mode image reconstruction in PET Phys. Med. Biol. 62 5114.

Xiongjun Zhang, Bahram Javidi, and Michael K. Ng (2017), Automatic regularization parameter selection by generalized cross-validation for total variational Poisson noise removal Applied Optics vol. 56, Issue 9, pp. D47-D51.

Office Action issued on Nov. 22, 2024 in Chinese Patent Application No. 202080035176.4 and English Translation thereof.

* cited by examiner

IMAGE RECONSTRUCTION

FIELD OF THE INVENTION

Aspects and embodiments relate to a method of creating an image representative of a measured dataset, a computer program product and apparatus operable to perform that method.

BACKGROUND

Inverse problems arise in many fields. Those fields include medical and pre-clinical imaging.

When dealing with an inverse problem in the field of imaging, an aim is to estimate one or more parameters, or a multi-dimensional density function, which represent some object of interest, often referred to as an image. For example, in medical imaging, the inverse problem of interest is typically called image reconstruction, and values of interest within 3D arrays of voxels, or 2D arrays of pixels, are estimated. Those values of interest may, in some examples, represent concentration, binding potential and/or rate of uptake of, for example, a radiotracer inside the human body (for example, positron emission tomography (PET) and single photon emission computed tomography (SPECT)), or proton density and tissue relaxation parameters for anatomical imaging (MRI).

Such reconstructed images and density estimates have far-reaching applications. In the medical field, the functional, molecular and anatomical images have applications including understanding, diagnosing and staging of diseases and understanding how a healthy human body functions. In the field of preclinical imaging, the reconstructed images have value in research into disease and development of new drugs. In other fields, the reconstructed images may have value in applications such as security, for example, security checks, satellite surveillance or safety, for example, non-destructive testing and seismic imaging.

An issue in relation to all inverse problems is that if the collected data are noisy then often no unique noise-compensated solution to the inverse problem exists. If no unique solution exists, a burden of choice falls upon those making and using imaging and sensing devices to select one or more fixed noise-compensating parameters for the image reconstruction process. Selection of such noise-compensating parameters makes a selection of one of many solutions that may satisfy the inverse problem. It will be appreciated that noise in collected data can impair image reconstruction in various ways and noise compensation and correction approaches look to compensate for those impairments. In conjunction with this, noise reduction methods can be deployed, the aim of which can be to reduce and mitigate noise in a collected data set.

In relation to medical imaging, the image which is interpreted by a clinician will be dependent on the manufacturer, or the user, in accordance with a particular fixed choice of noise-compensating procedure and noise-compensating parameters and, if they are using prior information, these fixed noise-compensating parameters can control the strength of prior information to use. It will be appreciated that many possible images could have been presented to the clinician, each of which could be read differently, potentially leading to a different diagnosis, prognosis or medical assessment.

Choice of the noise-compensating parameters, which determine a resulting image to use for interpretation purposes, is a significant issue in the imaging field. This can be particularly true in relation to multi-modal or synergistic image reconstruction. In such approaches, where information from other modalities is used (for example, magnetic resonance (MR) images to assist PET reconstruction), it is important not to misuse the information from other modalities, which can happen if inappropriate parameters are selected.

SUMMARY

A first aspect provides a method of creating an image representative of a measured dataset by iteratively updating a base image, the method comprising: generating a principal dataset from the measured dataset, the principal dataset comprising a dataset having noise at substantially the same level as the measured dataset; generating at least one additional dataset from the measured dataset, the additional dataset comprising: a dataset generated from the measured dataset such that each additional dataset has noise at substantially the same level as the measured dataset and such that each additional dataset is not identical to the principal dataset; processing the base image without noise compensation using the principal dataset and each additional dataset to obtain a principal interim image and at least one additional interim image respectively; comparing the principal and the at least one additional interim image to determine an indication of a level of noise present; and using the determined indication of noise present to select noise compensation to apply when processing the base image using the measured dataset to create a new base image representative of the measured dataset.

The first aspect recognises that noise can be a key problem in imaging. Noise can particularly be a problem in applications such as image reconstruction for emission tomography, where noise is significant. As described in more detail below, image reconstruction approaches using purely maximum likelihood or least squares estimates are not useful for clinical or research tasks. It is recognised that cross validation could offer some assistance when addressing the noise problem. Cross validation provides a data-driven selection of noise-compensating parameters for image reconstruction.

The first aspect addresses some issues with known image reconstruction approaches whilst utilising cross-validation techniques. In particular, the first aspect recognises that processing a measured dataset and processing one or more bootstrapped datasets (each of which suffers substantially the same noise as the measured data) can provide an objective mechanism to obtain an indication of a level of noise in the measured dataset. From one or more processed bootstrapped datasets and the processed measured dataset it becomes possible to compare processed bootstrapped datasets and processed measured datasets and calculate appropriate noise compensation parameters to apply to the measured dataset when creating an image.

Accordingly, a noise-compensation procedure applied in accordance with the first aspect is a mapping required to map each processed bootstrapped dataset as closely as possible to the processed measured dataset and a method in accordance with the first aspect can operate to find an appropriate set of noise-compensating parameters to apply in relation to a particular noise compensating procedure.

The first aspect may provide a method of creating an image representative of a measured dataset by iteratively updating a base image. The method may comprise creating a principal dataset from the measured dataset, the principal dataset comprising a dataset having noise at an identical, similar, or same level to the noise level of measured dataset.

The method may comprise creating at least one additional dataset from the measured dataset, the additional dataset comprising: a bootstrapped dataset sampled from the measured dataset, that bootstrapped dataset being selected from the measured dataset such that each additional bootstrapped dataset has noise at an identical, similar, or same level as the measured dataset. Each additional bootstrapped dataset may be substantially the same size as the measured dataset. The method may comprise processing the base image without using noise compensation using the first dataset and each additional dataset to obtain a principal interim image and at least one additional interim image respectively. The method may comprise performance of some comparison between the principal and the at least one additional interim image. That comparison may be used to determine an indication of a level of noise present in the measured (and bootstrapped) datasets. The method may comprise using the determined indication of noise present to select a level of noise compensation to apply when processing the base image using the measured dataset to create a new base image representative of the measured dataset. In particular, noise compensation parameters to apply in a noise compensation procedure may be selected based upon the indication of noise generated by the comparison step.

In some embodiments, the principal dataset comprises the measured dataset. In some embodiments, the principal dataset comprises a bootstrapped dataset created from the measured dataset. In some embodiments, the principal dataset comprises a similarly generated dataset by other sampling or machine learning methods, generated from said measured dataset.

In some embodiments, the step of creating at least one additional dataset comprises creating two or more additional datasets from the measured dataset, each of the additional datasets comprising: a bootstrapped dataset sampled from the measured dataset selected such that each additional dataset has noise at substantially the same level as the measured dataset.

In some embodiments, the step of generating at least one additional dataset comprises: creating one or more bootstrapped datasets sampled from the measured dataset.

In some embodiments, the step of generating at least one additional dataset comprises generating one or more additional datasets from the measured dataset, each of the additional datasets comprising: a dataset generated from the measured dataset such that each additional dataset has noise at substantially the same level as the measured dataset and such that each additional dataset is not identical to the measured dataset.

In some embodiments, comparing the principal and the at least one additional interim image to determine an indication of noise present comprises: taking into account a comparison between the principal interim image and at least one additional interim image to determine an indication of noise present. Accordingly, it is possible to take a more holistic view of the likely level of noise in a measured dataset.

In some embodiments, the step of taking into account comprises one or more of: calculating one or more characteristic of a distribution of the additional interim images relative to the principal interim image. Such a characteristic may comprise, for example, calculating an average indication of noise, calculating a median indication of noise, or calculating a maximum indication of noise.

In some embodiments, taking into account comprises: implementing an artificial neural network to seek appropriate noise compensation to apply to the measured dataset based on the one or more additional interim images created from the one or more additional dataset compared to the principal interim image created from the measured dataset. Accordingly, an optimal noise compensation approach (both parameters and procedure) to apply to a given dataset may be efficiently discovered by appropriate application of an appropriately configured neural network.

In some embodiments, the method comprises: using the selected noise reduction for processing an iterative update of the base image based on the measured dataset, in order to obtain a further iterative update of the base image. Accordingly, continued iteration may move any base image towards a "true" image represented by the measured dataset.

In some embodiments, the method comprises: processing the base image using a selected noise compensation procedure. In some embodiments, the method comprises: processing the base image using a different selected noise compensation procedure. In some embodiments, the method comprises: comparing a created image obtained using the selected noise compensation procedure and the different selected noise compensation procedure to select an appropriate noise compensation procedure to apply to the measured dataset. In some embodiments, selection of an appropriate noise compensation procedure comprises selecting which noise compensation procedure offers an additional interim image which is closest to the principal interim image. Accordingly, embodiments may open up a range of noise compensation possibilities and may optimise use thereof in dependence upon collected data. The noise compensation approach can be as simple as a Gaussian smoothing kernel for which, at each iterative step, an optimal kernel width can be found, or as complicated as advanced guided smoothing (again, with a parameterisation specifically optimised according to the measured data) for inclusion in reconstruction.

In some embodiments, comparing the principal and additional interim images to determine an indication of noise present comprises: implementing an objective function according to which the goal is to find one or more parameters for a noise compensating procedure which, when found and applied to the one or more additional interim images, leads to an update of each additional interim image such that their collective difference from the principal interim image is minimised. In other words, it is possible to use a denoising procedure which can be embedded directly at any or each step in an image reconstruction iterative algorithm. Embodiments can operate such that they adaptively and precisely optimise parameterisation of any denoising procedure for each iterative update of a base image, for a given measured dataset.

In some embodiments, the objective function comprises: a measure related to distance between the additional interim images and the principal interim image. In some embodiments, the measure related to distance comprises: one of: a sum of squares distance, a Kullback-Leibler measure of distance, any norm as a measure of distance, or another appropriate cross-likelihood measure correlated to distance. In some embodiments, the iterative update comprises an additive or multiplicative update. That is to say, a comparison between principal and additional interim images to determine a level of noise in the measured dataset and consequently determine appropriate noise compensation parameters for a given noise compensation procedure may be performed in various ways.

In some embodiments, the processing with noise compensation corresponds to a regularised iterative update derived from any regularised iterative image reconstruction algorithm. In some embodiments, the noise compensation procedure corresponds to an artificial neural network trained to map any of the additional interim images to match the principal interim image, such that the artificial neural network training can be applied to the principal interim image to obtain an update of the base image. That is to say, the noise compensation procedure applied when processing the base image to obtain an image representative of the measured dataset may be selected from various available noise compensation procedures.

In some embodiments, parameters of the noise compensation are modified to cause a greater level of noise compensation than that found by an optimisation procedure, in order to slow down iterative updates of the base image. In some embodiments, parameters of the noise compensation are modified to cause a greater level of noise compensation than that found by an optimisation procedure, in order to avoid accumulation of residual noise. Accordingly, a cautious update process may be implemented to more gently iteratively update the base image.

In some embodiments, continued iterative updates are such that the parameters of the noise compensation implemented are selected to be increasingly close to the parameters found by optimisation of the objective function. In some embodiments, continued iterative updates are such that the parameters of the noise compensation implemented are selected to be increasingly close to the parameters found by optimisation of the objective function. In some embodiments, continued iterative updates are such that the parameters of the noise compensation implemented are selected to be increasingly close to the parameters found by the optimisation procedure and that the parameters are selected to correspond to the greatest level of noise compensation found from all previous uses of the optimisation procedure in the continued iterative updates.

In some embodiments, the step of generating at least one additional dataset comprises generating one or more additional datasets from the measured dataset, the generating comprising sampling or machine learning methods, and each of the additional datasets comprising: a dataset generated from the measured dataset such that each additional dataset has noise at substantially the same level as the measured dataset and such that each additional dataset is not identical to the measured dataset.

In embodiments where the method comprises processing the base image using a selected noise compensation procedure, that noise compensation approach can be as advanced as use of an artificial neural network.

In embodiments where a denoising procedure is embedded directly at any or each step in an image reconstruction iterative algorithm, it will be appreciated that the method operates to adaptively and precisely optimise parameterisation of any denoising procedure for each iterative update of a base image, for a given measured dataset. The adaptive and precise optimisation of that denoising procedure is automatic and does not need any user-supplied parameters or guidance.

In embodiments where the method comprises a step of processing with noise compensation, the processing with noise compensation may correspond to a regularised iterative update derived from any regularised iterative reconstruction algorithm. Such an approach may allow for automatic and precise optimisation of the level of regularisation from more than one choice of prior, such that the strength of different choices of prior information can be automatically selected. For example, how much guided smoothing information to use compared to unguided smoothing. In other words, rather than picking from among a set of possible noise compensation procedures, it is possible to select how much of each noise compensation procedure to apply. Such implementations mean that the method may operate such that there is no need to pick a single candidate from a set of possible noise compensation candidates, but instead can apply different proportions of more than one noise compensation candidate.

It is noted, by way of clarification, that the method of the first aspect is envisaged, in some embodiments, to be fully automatic. That is to say, the method may occur without a user needing to make any selections of operational parameters. That is to say, the method may be wholly data driven, since, for example, preselection of overly cautious initial parameters to suit all datasets and all noise levels has the result that the processing of any measured dataset is a fully automatic and precise procedure.

By way of summary, the first aspect provides a method of creating an image representative of a measured dataset by iteratively updating a base image, the method comprising: generating a principal dataset from the measured dataset, the principal dataset comprising a dataset having noise at substantially the same level as the measured dataset; generating at least one additional dataset from the measured dataset, the additional dataset comprising: a dataset generated from the measured dataset such that each additional dataset has noise at substantially the same level as the measured dataset and such that each additional dataset is not identical to the principal dataset; processing the base image without noise compensation using the principal dataset and each additional dataset to obtain a principal interim image and at least one additional interim image respectively; comparing the principal and the at least one additional interim image to determine an indication of a level of noise present; and using the determined indication of noise present to automatically select noise compensation to apply when processing the base image using the measured dataset to create a new base image representative of the measured dataset.

The at least one additional dataset may comprise a bootstrapped dataset generated from the measured dataset, in a purely data-driven approach. Such an approach is truly data driven and mitigates any chance of the method having learned from other data. Of course, some embodiments may allow for the at least one additional dataset comprising a dataset generated from the measured dataset by an artificial neural network (ANN). In some embodiments an ANN may be used in part or entirely for the noise compensation procedure.

A second aspect provides a computer program product operable, when executed on a computer, to perform the method of the first aspect.

A third aspect provides imaging apparatus configured to create an image representative of a measured dataset from a base image, the apparatus comprising: dataset generation logic configured to generate a principal dataset from the measured dataset having noise at substantially the same level as the measured dataset and at least one additional dataset from the measured dataset, each the additional dataset being selected such that they comprise a dataset having noise at substantially the same level as the measured dataset; processing logic configured to process the base image using the principal dataset and the at least one additional dataset to obtain a principal interim image and at least one additional interim image respectively; comparison logic configured to compare the principal and at least one additional interim image to determine an indication of a level of noise present; and image creation logic configured to use the determined indication of noise to select a level of noise compensation to apply when processing the base image using the measured dataset to create a new base image representative of the measured dataset.

Embodiments of the third aspect correspond to embodiments described in relation to the first aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
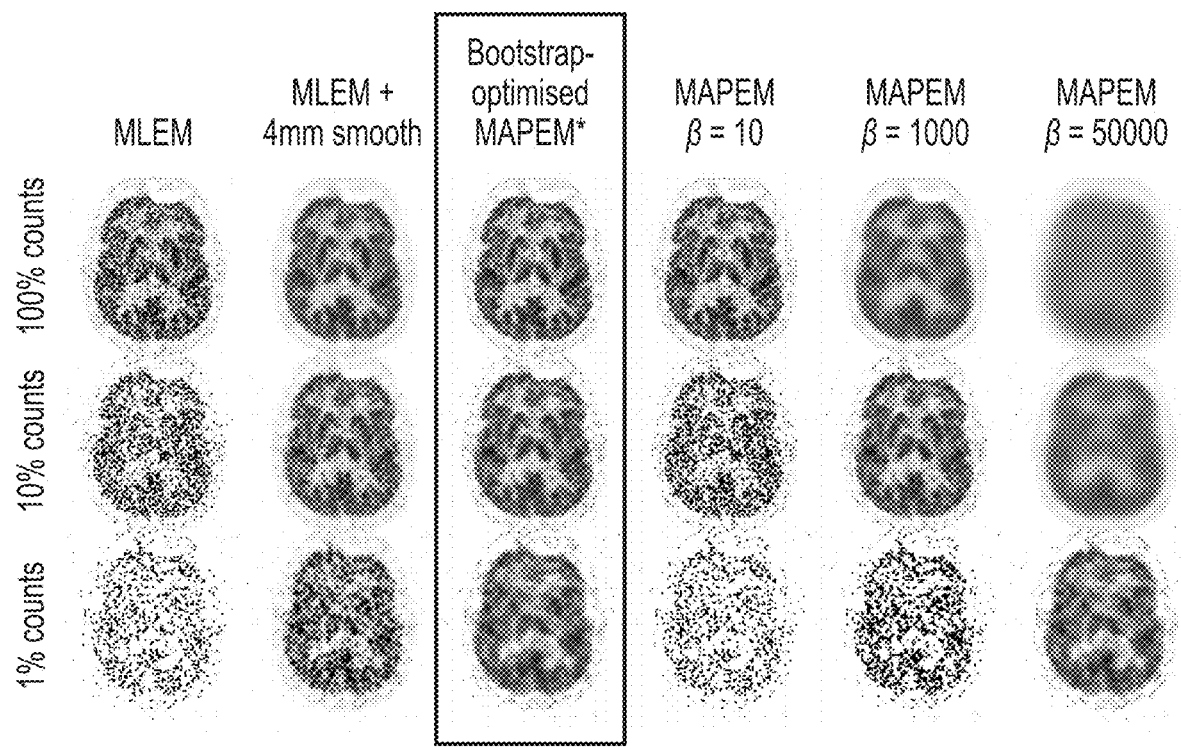
FIG. 1 comprises a set of PET images obtained using three different count levels with different reconstruction methods.

As described previously, when dealing with an inverse problem in the field of imaging an aim is to estimate a set of object representation parameters, or a multi-dimensional density function, which represents some object of interest, often referred to as an image. For example, in medical imaging, the inverse problem of interest is typically called image reconstruction.

This is an issue for the medical imaging industry, since a manufacturer, and/or user, needs to specify noise-compensating parameters for image reconstruction. For example, in relation to PET imaging these noise-compensating parameters may include: number of iterations and smoothing level. The chosen parameters will have a significant impact on the images reconstructed. In medical imaging applications the reconstructed image has an impact on how clinicians read "results" of a scan, which can influence diagnosis and decisions on patient management. In relation to PET and SPECT imaging the emission data acquired are very noisy due to the limited scan times and the limited amount of radioactivity injected into patients or research subjects, and hence the reconstructed images also suffer from noise problems.

Typical solutions in image reconstruction to compensate for noise fall into 7 categories, each requiring a manufacturer and/or user to make a preset choice of noise-compensating parameters:

1) Post-Smoothing

Post-processing and/or smoothing of the images/parametric maps after they have been reconstructed can successfully alleviate the noise. However, this post-processing comes at the cost of reduced spatial resolution: important details in the medical images are lost. This is true of conventional filtered back projection (FBP) methods, as well as iterative image reconstruction methods like ordered subsets expectation maximisation (OSEM). These methods will all result in noisy images unless smoothing is applied. More advanced post-processing methods can be applied, but in every single case, the post-processing will still need a choice of the level of noise compensation, facing the same problem as described below in relation to category 3.

2) Early Stopping

Methods, such as maximum likelihood expectation maximisation (MLEM), or its accelerated version, OSEM, are often stopped early in the iterative process so that the aforementioned smoothing is not necessary. However, this comes at the cost of potentially spatially-variant noise and resolution properties, with some regions having lower noise than others, and with some details of the image being incompletely resolved while other regions are resolved. Finally, there is a requirement to choose the number of iterations (the noise-compensating parameter in this case being the number of iterations), and so the level of noise is directly chosen by the user. Cross-validation and other stopping rules remove the choice of the number of iterations, but leave behind the issues of incomplete convergence of the iterative reconstruction algorithm.

3) Regularisation Methods

Bayesian and maximum a posteriori (MAP) methods are used with iterative algorithms, which impose prior expectations on the images, such as smoothness, or smoothness within defined regions (e.g. through use of anatomical information and edge preserving priors, such as using MRI to guide regularisation of PET reconstruction). The problem with these methods is the need for careful selection of the parameters (called 3o hyperparameters in the Bayesian context), which influence the level of noise and resolution, and really this parameter selection needs to be carefully tuned for each scan. In fact, it is extremely difficult to be sure that the best parameters have been selected for any given reconstruction of a given data set. Underestimating the regularisation leaves too much noise in the images, whereas overestimating the regularisation parameter compromises important image details. This is particularly problematic for multi-modal imaging, if MRI (for example) is to be used to guide the regularisation of PET or SPECT image reconstruction: how much of the prior information should be used, how "strong" should the prior be?

4) Change of Basis

These methods use spatial basis functions other than conventional pixels or voxels, such as larger regions of interest (ROIs), or kernel spatial basis functions derived from temporal similarities in the detail, or derived from similarity measures from other imaging modalities (e.g. MRI). These methods successfully reduce noise, but impose a certain structure on the images, and once again leave the user with the burden of parameter selection for the generation of the kernels, whereby the level of detail and noise compensation is again in the hands of the user, as well as the number of iterations to use.

5) Inter-Update Filtering

This is similar to the post-smoothing method described above, but is conducted between iterations. The same problem arises of needing to decide how much smoothing apply: the problem of parameter selection for the noise compensation.

6) Stopping Based on Cross-Validation

Such approaches terminate reconstruction early and therefore use an incompletely converged reconstruction, suffering potentially from similar issues to category 2 above. As a consequence, cross-validation stopping rules have not received any notable uptake in, for example, the emission tomography community.

7) Parameter Selection Based on a Limited Grid Search

This approach requires the user to preselect a limited number of fixed sets of candidate parameters for the noise-compensation. Then a full reconstruction is conducted for each set of candidate parameters, and either an L-curve method or cross-validation method is used to pick which of these sets of reconstruction parameters to use. These methods are limited in two main ways: the need for the user to preselect a limited number of fixed candidate parameters, and the need to conduct an entire (often computationally intensive) image reconstruction for each candidate set of parameters. Furthermore, in the case of cross-validation, there is also the need to define a subset of the data for cross-validation purposes, for which there are many possible choices.

Specific implementations of these approaches, in use by industry for clinical PET imaging, include: OSEM and/or HD-PET from Siemens: which typically relies on either early termination (category 2) or post-processing (category 1) to compensate for noise; and QClear from GE which requires a user to decide upon a key regularisation parameter (category 3).

The major disadvantages with approaches to compensating for image noise in emission tomography data which rely on approaches in line with the 7 categories outlined above include that no precisely optimal, practically robust or computationally-efficient way of choosing the level of noise compensation exists. It is clear that different levels of noise compensation are needed for different datasets according to the noise level and the object being imaged. Furthermore, a user or manufacturer is required to specify how much noise compensation, for example, smoothing or regularisation should be present in the image which is subjective, or at best, not precisely optimal for the actually acquired data, and involves a user-defined trade-off between noise and image details. If using multi-modal information to assist reconstruction, it is not known how much the prior information should, or should not, be used.

OVERVIEW

Before details of specific implementations of arrangements are described in detail, a general overview to the approach is provided.

It is known that noise can be a key problem in imaging. Noise can particularly be a problem in applications such as image reconstruction for emission tomography, where noise is significant. As described above, image reconstruction approaches using purely maximum likelihood or least squares estimates are not useful for clinical or research tasks.

Current methods for counteracting noise include: post-reconstruction smoothing which comes with the question of how much to smooth; early termination of iterative algorithms, which comes with the question of when to terminate and what such an image corresponds to and for which space-variant convergence is a concern; and maximum a posteriori reconstruction which comes with the question of to what amount should one regularise (i.e. what is the choice of the hyperparameter(s), often labelled as β).

It is recognised that cross validation (CV) could offer some assistance when addressing the noise problem. CV provides a data-driven selection of noise-compensating parameters for image reconstruction.

Known CV approaches come with issues, for example, CV needs to partition data and early use of CV in, for example, PET reconstruction simply splits the obtained data into 2, so 'optimality' of noise-compensating parameters ends up being based on a subset of data. CV in known approaches is either not used to give reliable images (e.g. early stopping approach with the problems of early termination), or else involves a relatively crude selection from a limited number of fixed choices of candidate noise-compensating parameters, where for each choice an entire image reconstruction is required.

Approaches recognise that a bootstrap tuned approach can be a useful method. Bootstrapping to obtain a new dataset means the same size data can be used as an "additional" dataset, this solves the first issue with CV outlined above.

Likewise, approaches recognise that a data generation approach (such as from artificial neural networks) can be used to obtain a new dataset, which also means the same size data can be used as an "additional" dataset, again solving the first issue with CV outlined above.

Figure 4:
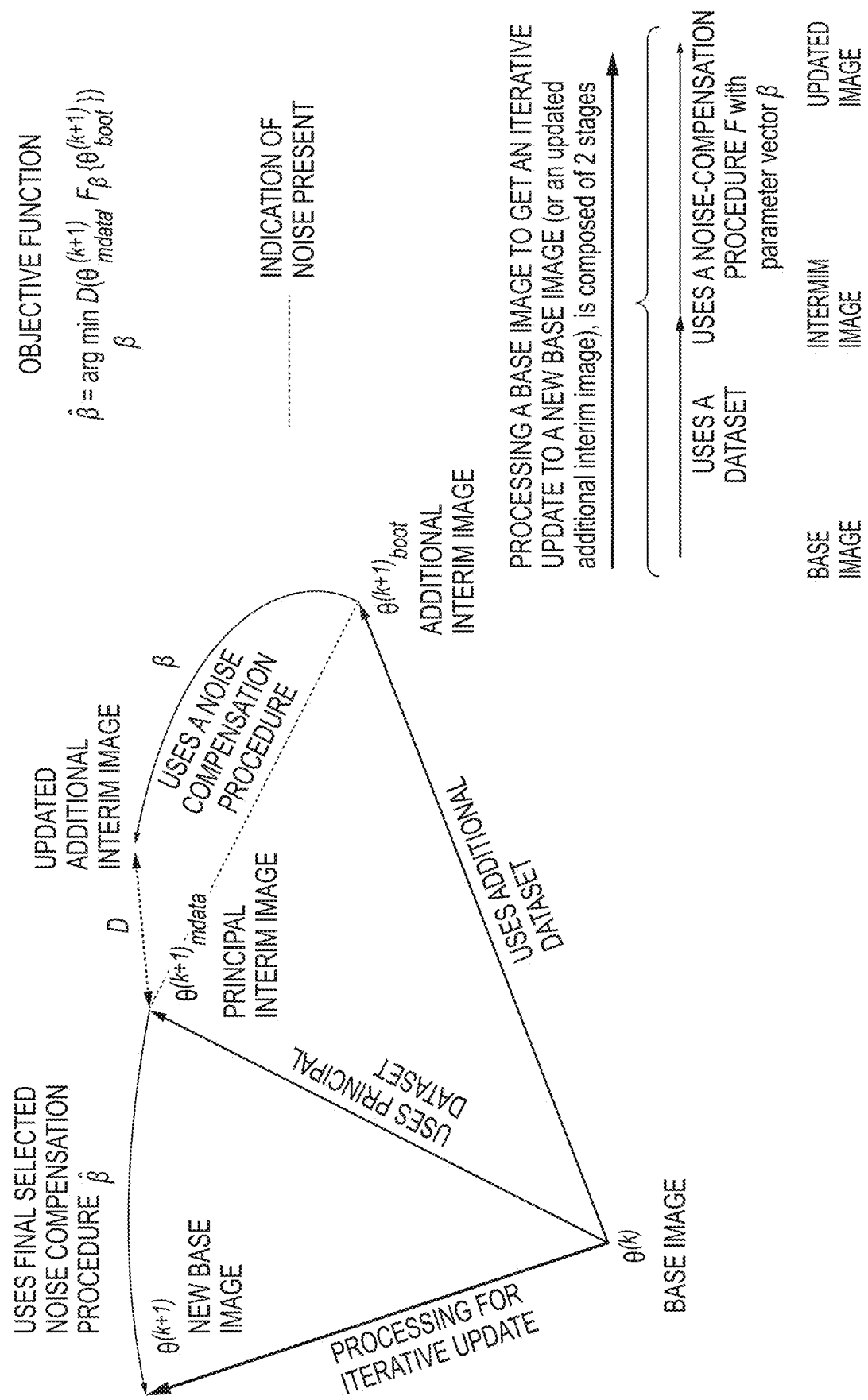
FIG. 4 illustrates schematically a general approach to data processing.

FIG. 4 illustrates schematically the general approach used in various implementations described in detail below.

Processing the measured data and processing the one or more generated (e.g. bootstrapped) datasets (each of which suffers substantially the same noise as the measured data) provides an indication of the noise in the measured data. From the processed generated (e.g. bootstrapped) datasets and processed measured data it is possible to compare the processed generated (e.g. bootstrapped) data and processed measured data and calculate appropriate noise compensation parameters to apply in the processing of the measured data.

The noise-compensation procedure is the mapping required to take each processed generated (e.g. bootstrapped) dataset to match as closely as possible the processed measured data.

The noise-compensation parameters for a given noise-compensation procedure are given by:

$$\hat{\beta} = \underset{\beta}{\operatorname{argmin}}\, D(\theta_{mdata}^{(k+1)}, F_\beta\{\theta_{boot}^{(k+1)}\})$$

Approaches operate to find an appropriate set of noise-compensating parameters to apply in relation to a particular noise compensating procedure.

It will be appreciated that the approach can be applied to one or more noise compensating procedures for a given measured dataset, each application of the approach giving an associated set of one or more noise compensating parameters for a given noise compensating procedure.

Approaches may then be implemented to objectively "choose" an appropriate noise compensating procedure to apply to a given measured dataset. In other words, approaches can be implemented in such a way to identify a noise compensating procedure (of a given selection of noise compensating procedures) which is best suited to a given measured dataset.

Figure 5:
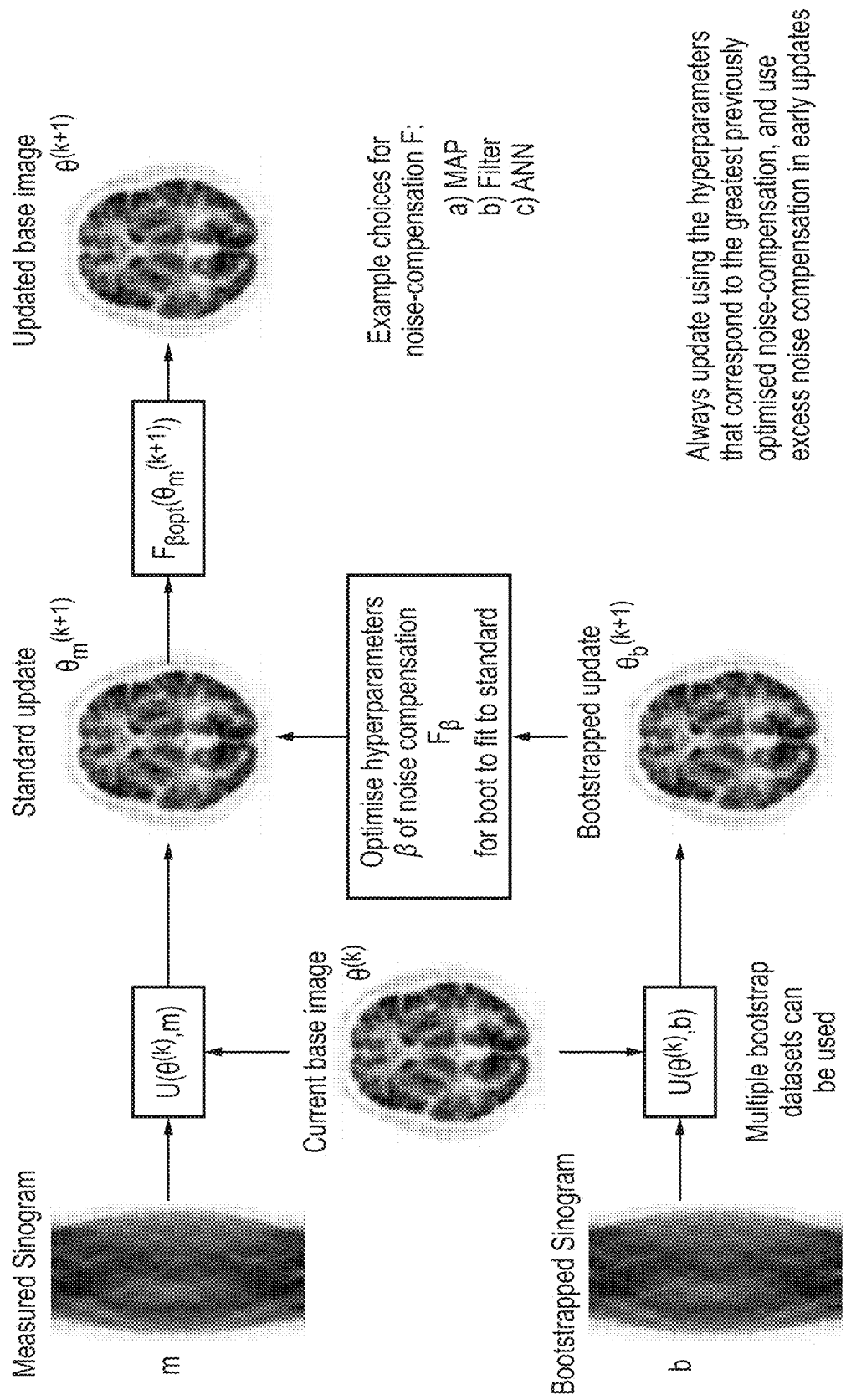
FIG. 5 illustrates schematically a conceptual overview of a general imaging approach in accordance with a data processing approach according to FIG. 4.

FIG. 5 illustrates schematically a conceptual overview of a general imaging approach in accordance with a data processing approach according to FIG. 4.

Approaches in line with those described in relation to FIGS. 4 and 5 can provide an objective, user-independent solution to an inverse problem. Such inverse problems may comprise, for example, image reconstruction and kinetic/functional parameter estimation in PET or SPECT.

Approaches can allow for image reconstruction without a need for a manufacturer or a user to specify hyperparameters relating to the level of noise-compensation to use. Approaches can offer a useful method for implementation in relation to multi-modal imaging (such as simultaneous PET-MR), where it is desired to exploit information from each modality, but it is not known how much, if any, prior information can be safely used in the reconstruction.

Approaches recognise that it is possible to use one or more, easy to generate, bootstrapped datasets in order to estimate appropriate noise-compensating parameters for each and every iterative update.

Approaches recognise that nearly all iterative image reconstruction methods can be regarded, at any given step, as an update function U, which uses a current image (described by parameters $\theta^{(k)}$ at iteration k) and the measured data m, to deliver a new image $\theta^{(k+1)}$:

$$\theta^{(k+1)} = U(\theta^{(k)}, m) \quad (1)$$

Iterative image reconstruction algorithms, in effect, proceed at each iteration to add on a new 'change image' to a current image, so as to progress towards an image that satisfies the requirements of an objective function (for example, maximum likelihood (ML), least squares (LS) or maximum a posteriori (MAP)). For example, for an MLEM algorithm, it is an ML objective that needs to be satisfied. For MAP, it is a user-specified regularised objective (with user-specified regularisation hyperparameters) that needs to be satisfied, which can exploit prior information from other imaging modalities (for example, MRI for PET). However, MLEM and other non-regularised objectives/algorithms (e.g. LS/conjugate gradient) lead to excessive noise amplification, whereas MAP and other regularised methods lead to a user-selected trade-off between image detail and image noise.

Approaches recognise that it is appropriate to use a bootstrapped replicate dataset, b, obtained by resampling the measured data, m, to give, at an iteration k, a bootstrapped updated image:

$$\theta_{boot}^{(k+1)} = U(\theta^{(k)}, b) \quad (2)$$

The updated image will also suffer from the noise present in b, but notably this will be different noise to that in m (as the actual measured data m are regarded by bootstrapping as a model of the mean of a large ensemble of noisy datasets like b).

Approaches fit a bootstrapped update image to a conventional measured data update image by optimising noise-compensating parameters applied to a bootstrapped update, and then using these optimised noise-compensation parameters for processing a standard iterative update from measured data, in order to obtain the next iterative update of the image.

The optimisation stage, which is an image-space fitting, may be achieved by implementing a cross-objective function, "ensemble mean objective function", or cost function, as follows:

$$\hat{\beta} = \underset{\beta}{\mathrm{argmin}}\, D(\theta_{mdata}^{(k+1)}, F_\beta\{\theta_{boot}^{(k+1)}\}) \quad (3)$$

in which the goal is to find an optimal noise-compensation parameter(s), for a noise-reducing operator $F_\beta\{\ \}$ which when applied in some way (to be detailed below) to the bootstrapped iterative update of the image $\theta_{boot}^{(k+1)}$, leads to a bootstrapped update that best fits the conventional update image, $\theta_{mdata}^{(k+1)}$, according to the cross-objective function.

The cross-objective function is a measure related to the distance D between the two images, which can be measured in many ways, but for Gaussian data corresponds to a least squares fit (to maximise a Gaussian cross likelihood), and for Poisson distributed data corresponds to the Kullback-Leibler (KL) measure of distance (to maximise a Poisson cross likelihood).

This cross-objective function can also be viewed as an "ensemble mean objective function". The ensemble mean objective function is a measure related to the distance D between the mean of a large ensemble of noisy update images (modelled by $\theta_{mdata}^{(k+1)}$) and any one or more of the noisy updates ($\theta_{boot}^{(k+1)}$).

Having found the optimal noise-reduction parameters $\hat{\beta}$ (which minimise the cross objective), the next update of the image can be given by:

$$\beta^{(k+1)} = F_\beta\{U(\theta^{(k)}, m)\} \quad (4)$$

The process can be repeated for the next iterative update, and so on.

Approaches recognise that the noise-compensation parameters in early iterative updates will need to be modified to cause a greater level of noise compensation than that found by the optimisation procedure, in order to slow down iterative updates and avoid accumulation of residual noise due to the inability to perfectly fit a noise-compensated bootstrapped update image to a conventional measured data update image.

Approaches recognise that with continued iterative updates, the noise-compensation parameters are selected to be increasingly close to the noise-compensation parameters found by the optimisation procedure, and that the noise-compensation parameters are selected to correspond to the greatest level of noise compensation found from all previous uses of the optimisation procedure in the continued iterative updates.

FIG. 5 illustrates schematically a conceptual overview of a general image reconstruction approach in accordance with a data processing approach according to FIG. 4. As shown conceptually in FIG. 5, a base image is processed via an iterative update U using a measured dataset to give a "standard" update. Also shown conceptually is the processing of the base image using the same iterative update function U, but using a bootstrapped dataset to give a "bootstrapped" update. Those updates can be considered to be "interim" images or updates. As shown schematically in FIG. 5, noise compensating parameters can be found which operate on the bootstrapped image updates to minimise a difference between the standard and bootstrapped image updates. Having found noise compensating parameters which meet the minimised difference criteria, those noise compensating parameters can be used to process the base image via an iterative update U whilst also applying noise compensation to give a new updated base image.

Having given a general overview, a number of specific implementations of approaches are detailed below:

a) Filtering of an Additive Change Image

This is a simple and intuitive approach likely to appeal to many, given its simplicity, flexibility and robustness. The updating function is modelled as follows:

$$\theta_{boot}^{(k+1)} = U(\theta^{(k)}, b) = \theta^{(k)} + \Delta^{(k)}(b) \quad (5)$$

where $\Delta^{(k)}(b)$ is the 'change image' at iteration k which is effectively added to a current image to obtain the next update. Approaches select a denoising procedure for the change image which can be anything from a simple Gaussian smoothing, through to a multi-modal guided filtering process, or even a machine learning based denoising such as an artificial neural network. The denoising procedure can be represented by an operator $F_\beta\{\ \}$, $$F_\beta\{\theta_{boot}^{(k+1)}\}=\theta^{(k)}+F_\beta\{\Delta^{(k)}(b)\} \quad (6)$$

And a goal is set to find an "optimal" choice of the noise compensation parameter(s) through use of the cross objective function (3). In the case of PET or SPECT data that goal would correspond to minimising the KL distance between the two images (this distance measure arises directly from seeking the maximum Poisson log-likelihood estimate). It will be appreciated that a goal other than minimising KL distance may be selected.

In equation (6), the $F_\beta\{\ \}$ noise-compensating procedure (e.g. simple smoothing, or multi-modal guided edge-preserving smoothing in the case of MR guidance of PET or SPECT), has one or more noise compensating parameters $\beta$. In one example, a user selects a noise-compensating procedure and NOT the noise compensating parameters $\beta$. The cross-objective fitting in accordance with approaches operates automatically to adapt to the noise level in measured data and select appropriate noise compensating parameters.

It will be appreciated that whilst the example above relates to a case of a noise compensation applied to an additive update (a 'change image'), the approach can similarly be applied to a multiplicative update, or indeed even to an entire updated image.

Having found the "optimal" noise compensating parameter(s) $\beta$ by use of the cross-objective function, it is possible to update the image obtained from the original measured data using optimised noise-compensating parameters according to $$\theta^{(k+1)}=\theta^{(k)}+F_\beta\{\Delta^{(k)}(m)\} \quad (7)$$

b) A Simple Inter-Update Filter

A variation of the method described in (a), in which (6) is replaced by:

$$F_\beta\{\theta_{boot}^{(k+1)}\}=F_\beta\{\theta^{(k)}+\Delta^{(k)}(b)\} \quad (8)$$

Such a method is different to that described in (a), since the entire update image is subject to noise compensation, rather than an isolated noisy-update 'change image'.

c) a MAP-EM Update

Another implementation of the general approach is one in which it is applied to Bayesian methods, which use a MAP objective. Any MAP update algorithm, which depends on a choice of prior and a regularisation hyperparameter, can be used to generate a processed bootstrap update.

For example, using the method of DePierro [1] for a weighted quadratic Gibbs prior probability of the image, it is possible to obtain an iterative EM update based on the MAP objective, which is of the following general form:

$$\theta^{(k+1)} = \frac{2s_j\theta_{EM}^{(k+1)}}{B+\sqrt{B^2+4\beta s_j \theta_{EM}^{(k+1)}C}} = F_\beta\{U(\theta^{(k)},m)\} \quad (9)$$

where the terms B and C depend on weighted combinations of neighbouring voxels from the current image $\theta^{(k)}$, allowing, for example, multi-modal guided regularisation via a spatially-variant weighted quadratic prior (e.g. the method of Bowsher [2]). According to such an implementation, the noise compensation parameter $\beta$ is known as the hyperparameter of the Bayesian prior, where it is clear that $\beta=0$ corresponds to no noise compensation, and so selecting $\beta$ is a critically important challenge.

Based on equation (9), it is possible to use the cross-objective optimisation of $\beta$ with the bootstrapped data so that an appropriate amount of prior information can be included in the iterative MAP-EM update. This implementation of the general approach addresses a significant challenge associated with regularised methods, especially in the context of multi-modal guided image reconstruction.

Such an approach permits automatic and precise optimisation of $\beta$, and a user does not need to specify any level of regularisation to achieve a convergent MAP-EM image reconstruction algorithm. That algorithm delivers a final converged estimate of the reconstructed image fulfilling a desired regularised objective function.

It will be appreciated that more than one regularisation component can be used in the objective function, for example, $\beta_1$ for the first part, $\beta_2$ for the second part, and so on.

This may have particular value in the context of guided image reconstruction, whereby the level of guided regularisation can be automatically and precisely found, along with the level of conventional unguided regularisation (for example, a quadratic penalty function).

It will be appreciated that as noise tends to zero in measured data (i.e. infinite counts) the bootstrap data will tend towards the measured data. As a result, no noise-compensation is needed for data with no noise (optimal $\beta$ from the cross objective function, "the ensemble mean objective function", will approach zero). In contrast, as noise increases (i.e. low counts), the bootstrapped data derived update will need increasing levels of noise compensation in order to fit an update derived from the measured data. In other words, the optimal $\beta$ from the cross-objective fitting will increase with increasing noise in the measured data, as more noise-compensation will be needed to map a noisy update towards a model of the mean of an ensemble of noisy updates.

Demonstration of Approaches

To demonstrate the efficacy of implementations of the general approach outlined above, the case of a MAP EM 3D reconstruction is demonstrated with real data.

The figures described below show how effective the general strategy is, for automatic noise-reduction of PET data, at varying noise levels, without the user choosing the noise-compensation level.

FIG. 1 comprises a low, mid- and high-count data comparison (for 1%, 10% and 100% of the measured real data). The first column comprises the conventional MLEM reconstruction of these three cases, the second column shows these images with typical post-smoothing with a 4 mm Gaussian kernel (as often done as standard for clinical images). The rightmost three columns (columns 4, 5 and 6) show standard MAPEM reconstructions for different choices of the hyperparameter $\beta$, where it can be seen that the visually better results are obtained for different choices of hyperparameter for different count levels. The third column, outlined in the Figure, shows that the bootstrap-optimised MAPEM method automatically delivers images of good quality for all count levels, which cannot be found using the other methods unless their hyperparameters are adjusted and explored by the user.

Figure 2:
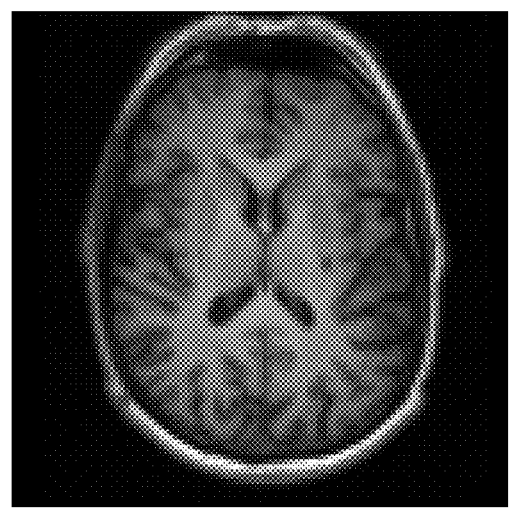
FIG. 2 is an MR image for the subject in FIG. 1

FIG. 2 shows the MR image for the subject data from FIG. 1.

Figure 3:
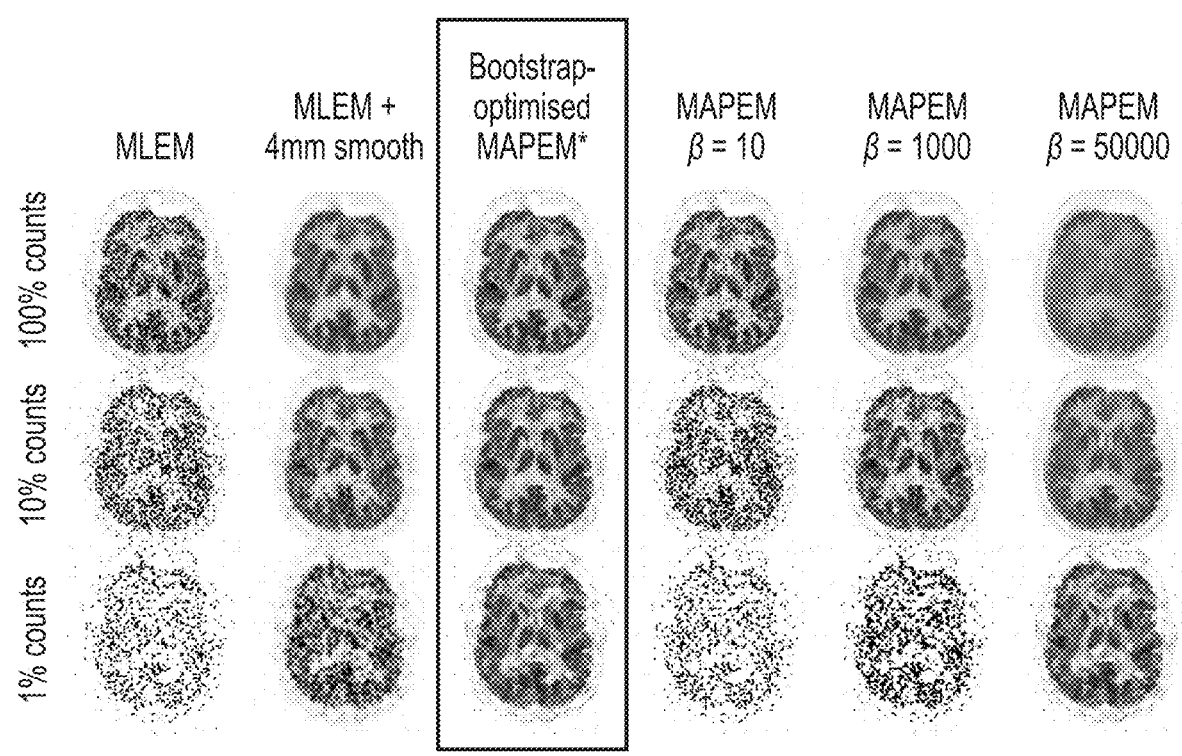
FIG. 3 comprises a set of PET images obtained using three different count levels with different reconstruction methods which make use of structural prior information from the subject's MRI.

FIG. 3 comprises a similar comparison to that of FIG. 1, the general structure of columns and images is the same as that described in relation to FIG. 1, but now making using the MR image from FIG. 2, in order to provide prior structural information for MAP EM to assist in the noise compensation, using the Bowsher method [2]. In this case again, the bootstrap-optimised MAPEM method automatically picks the appropriate hyperparameters for all noise levels. It will be appreciated that the level of noise compensation applied by implementations described above is appropriate to the level of noise in the data. It is believed that a clinician would prefer images such as those shown in the third outlined column, compared to the current standard methods shown in the other columns.

FIGS. 1 and 3 illustrate possible results using implementations in accordance with described approaches, with high count data and extremely low count data, and the same algorithm has been used in both cases. It can be seen that consistent good quality images are obtained by applying a method in accordance with described approaches. The third outlined column shows an excellent result in which a strength of smoothing, the amount of the prior which is used, is visually appropriate.

It will be appreciated that there is scope for applying the described approach in relation to various other priors and filters, and for all of the various hyperparameters that are implicated in such priors and filters. A myriad of priors and image processing filters can be considered, meaning the approach described has considerable potential for exploitation of state-of-the-art image denoising methods (for example, those based on guided smoothing, local patch-based methods, or those based on various artificial neural network architectures), by embedding them into a rigorous framework which provides automatically-selected levels of noise compensation for image reconstruction, whereby a user or manufacturer has only had to choose which noise compensation method to use, but without any need to specify the noise-compensating parameters (i.e. by how much to apply) the noise compensation.

Implementations of approaches allow for objective and precise selection of a trade-off between image detail and image noise throughout iterative updates by means of cross-objective fitting. Approaches remove arbitrary noise compensation parameter selection from a user and/or manufacturer, providing a robustness of reconstructed image quality. Such robustness for highly varying count levels has not previously been obtained in emission tomography. Approaches can be of particular use in the context of multi-modal imaging, where other images can be used to assist in noise reduction, and where it can be very subjective to decide to what strength such additional sources of information should be used.

Advantages of implementations using approaches described may include, for example:
1) Confidence in the objectivity of resulting image quality. Automatic selection of a level of noise compensation to apply means that the image reconstructed via bootstrap cross-objective denoising parameter estimation is a low noise image with only as much detail as is supported by the data. Results indicate that a method in accordance with described approaches converges to a good quality image, in accordance with the statistical quality of the data. Existing methods typically depend on user or manufacturer-specified varying levels of noise reduction, usually traded-off with image features which can't necessarily be supported by the data and can be misrepresentative of a scan.
2) Scope for implementation with any denoising or noise compensation method. Approaches allow for implementation within a framework which allows for "optimal" exploitation of any denoising procedure, for example, simple Gaussian kernel smoothing methods, simple regularisation (as shown in FIG. 1) through to multi-modal guided regularisation methods (as shown in FIG. 3) and the use of methods from machine learning, such as artificial neural networks. This may be particularly significant in relation to multi-modal guidance, where it is common to overuse any prior structural information, thus giving misleading and/or artificial looking images. The results obtained by using approaches such as those demonstrated above illustrate how prior image guidance can be used at a strength and edge sensitivity which is automatically adapted to the quality of the data, obviating a major issue with existing guided regularisation methods.
3) Simplicity, scope and practicality: a manufacturer or user no longer has the task of specifying noise-compensation parameters to reconstruct a given dataset, so the level of information (spatial resolution and details vs. the amount of noise) in the image is not dependent on subjective parameter selections. The method can be very simple to implement, allowing any iterative image reconstruction method to be adjusted with the embedding of any preferred noise compensation procedure, where the strength of noise compensation will be data dependent, automatically found by the method. Scope for exploration of different state-of-the-art noise compensation methods is considerable, allowing multi-modality based noise compensation to be implemented at a strength supported by measured data.
4) Theoretical appeal: reconstructed images use noise compensation parameters found from a statistically motivated objective function: it is the image which optimises the cross objective for a given update step in the iterative reconstruction, which could be a cross-likelihood (Poisson or Gaussian).

As can be seen from the illustrations in FIGS. 1 and 3, implementations in accordance with the approach described have been successfully implemented with 3D real PET data, for three different count levels, from low to high noise levels. In the illustrated examples, the approach has been implemented using noise compensation via MAP regularisation, and for the case of MRI-guided MAP regularisation (whereby a structural image is used in the prior—with the level of regularisation controlled by the bootstrap cross objective).

It will be appreciated that approaches may also be implemented in 2D and 4D imaging methods.

It will be further appreciated that described approaches are applicable to any inverse problem in which parameter estimation occurs and where noise in the data is a performance limiting factor. Major example commercial applications include the case of medical imaging, in particular: PET or SPECT scanners: for reconstruction in clinical and pre-clinical imaging for cancer, heart and the brain, where limited scan times and limited injected activity lead to count-limited (noisy) data; Low dose computed tomography (CT): reconstruction of anatomical images, angiographic images, whenever data quality is low (to reduce radiation exposure, or for fast dynamic imaging); and low SNR magnetic resonance imaging (MRI) sequences: some MR images suffer from limited SNR and therefore have noisy k-space data.

Outside medical imaging, approaches can be used for any parameter estimation problem suffering from noisy data. Other fields in which the approach can be applied include: image processing and denoising (e.g. photo and image denoising, video denoising); non-destructive testing (e.g. CT and impedance tomography); remote sensing (e.g. satellite imaging and seismic imaging); astrophysics (e.g. multi-spectral imaging); and security imaging (e.g. CT).

Cross validation methods [3] and bootstrap filtering methods [4] are known. The known methods rely on cross validation as a stopping criterion—which means the results are susceptible to suffering from spatially-variant convergence (spatially-variant resolution and noise). More recent advanced cross validation methods [5] require preselection of a limited number of example noise-compensating parameters, specification of a subset of data to cross validate, and then an entire reconstruction to be conducted for each example set of noise-compensating parameters. That results in low precision selection of the noise compensation parameters, and depends also on the choice of subset of data for cross validation purposes. Other more advanced generalised cross validation methods [6] rely on fixed instances of regularisation such as total variation, and so do not offer flexibility, scope and general applicability. The bootstrap filtering uses a forward projection of the cross validation stopped image. The forward projection is used as a means of generating bootstrap samples. The known method involves reconstruction from numerous bootstrap samples and finding an expectation.

Approaches and implementations as described here differ from those known in that:

Approaches can relate to a method which can be run once only to convergence, involving no stopping criterion.

Approaches are such that a bootstrapped dataset is derived directly from resampling the raw measured data, and not from a forward projection of a cross-validated stopped image.

Approaches are such that a single bootstrapped dataset can be used rather than multiple datasets or selection of data subsets for cross validation.

Approaches are such that they allow any denoising procedure to be embedded directly at any or each step into any iterative reconstruction algorithm. Approaches are such that they can adaptively and precisely optimise parameterisation of any denoising for each update. Approaches are such that they can automatically and precisely optimise parameterisation of any denoising for each update.

Approaches are such that only one iterative reconstruction procedure is involved to deliver precisely optimised noise-reduction parameters, not needing multiple reconstructions to be conducted and then retrospectively compared by cross validation for a low-precision choice from among a limited number of preselected noise-reduction parameters.

It will be appreciated that approaches open up a range of noise compensation possibilities and may optimise use thereof in dependence upon collected data. The noise compensation approach can be as simple as a Gaussian smoothing kernel for which, at each iterative step, an optimal kernel width can be found, or as complicated as advanced guided smoothing (again, with a parameterisation specifically optimised according to the measured data) for inclusion in reconstruction. In contrast, the known methods such as those in [3] and [4] concern stopping or a single "non-linear" filtering method, which is defined by the average of the approximated multiple bootstrapped MLEM results. That provides a one off averaging process, which is further constrained by central use of a stopped image estimate, which has unknown spatially variant convergence.

Approaches described herein may be implemented for any standard iterative image reconstruction method and provide a method in which use of, for example, just one (or more) bootstrapped resampled datasets allows powerful state-of-the-art denoising algorithms to be directly embedded into image reconstruction with relative simplicity. Approaches provide a mechanism for automatic data-dependent and precision optimisation of the strength of any denoising at every update.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

REFERENCES

[1] A. R. De Pierro (1995) A Modified Expectation Maximization Algorithm for Penalized Likelihood Estimation in Emission Tomography, IEEE Trans. Med. Imaging, vol. 14, no. 1, pp. 132-137
[2] J. E. Bowsher et al (2004) Utilizing MRI Information to Estimate F18-FDG Distributions in Rat Flank Tumors, IEEE Nucl. Sci. Symp. Conf. Rec., vol. 4, 2004, pp. 2488-2492.
[3] Coakley, K. J. (1991), A cross-validation procedure for stopping the EM algorithm and deconvolution of neutron depth profiling spectra IEEE Transactions on Nuclear Science Volume: 38, Issue: 1
[4] Coakley, K. J. (1996), Bootstrap method for nonlinear filtering of EM-ML reconstructions of PET images. Int. J. Imaging Syst. Technol., 7: 54-61. doi:10.1002/(SICI)1098-1098(199621)7:1<54::AID-IMA7>3.0.CO; 2-T
[5] Zhang et al (2017) Regularization parameter selection for penalized-likelihood list-mode image reconstruction in PET Phys. Med. Biol. 62 5114
[6] Xiongjun Zhang, Bahram Javidi, and Michael K. Ng (2017), Automatic regularization parameter selection by generalized cross-validation for total variational Poisson noise removal Applied Optics Vol. 56, Issue 9, pp. D47-D51

The invention claimed is:

1. A computer implemented method of creating an image representative of a measured dataset by iteratively updating a base image, said method comprising:
using said measured dataset as a principal dataset or generating a principal dataset from said measured dataset by generating a bootstrapped dataset from said measured dataset;
generating at least one additional different dataset from said measured dataset, said additional different dataset comprising: a dataset generated from said measured dataset such that each additional different dataset has noise at substantially the same level as said measured dataset and such that each additional different dataset is not identical to the principal dataset by creating one or more bootstrapped datasets sampled from said measured dataset;
processing the base image without noise compensation using said principal dataset to obtain a principal interim image and processing the base image without noise compensation using each additional dataset to obtain at least one additional interim image;
comparing said principal and said at least one additional interim image to determine an indication of a level of noise present; and
using said determined indication of noise present to select noise compensation to apply when processing the base image using said measured dataset to create a new base image representative of said measured dataset;

wherein comparing said principal and at least one or more additional interim images to determine an indication of noise present comprises:

implementing an objective function according to which the goal is to find one or more parameters for a noise compensating procedure which, when found and applied to said one or more additional interim images, leads to an update of each additional interim image such that their collective difference from the principal interim image is minimized; and wherein parameters of said noise compensation are modified to cause a greater level of noise compensation than that found by an optimization procedure of the objective function in order to slow down iterative updates of said base image and avoid accumulation of residual noise and in which continued iterative updates are such that said parameters of said noise compensation implemented are selected to be increasingly close to said parameters found by said optimization procedure of the objective function and that said parameters are selected to correspond to the greatest level of noise compensation found from all previous uses of said optimization procedure in the continued iterative updates.

2. A method of creating an image according to claim 1, wherein said method comprises: using said selected noise compensation for producing an iterative update of said base image based on said measured dataset, in order to obtain said new base image representative of said measured dataset and optionally wherein said iterative update comprises an additive or multiplicative update.

3. A method of creating an image according to claim 2, comprising: processing said base image using a different selected noise compensation procedure; and comparing a created image obtained using said selected noise compensation procedure and said different selected noise compensation procedure to select which noise compensation procedure to apply when processing said base image using said measured dataset to create a new base image representative of said measured dataset, and optionally wherein selecting which noise compensation procedure to apply comprises: comparing an interim image obtained using said noise compensation procedure to said principal interim image.

4. A method of creating an image according to claim 1, wherein said objective function comprises: a measure related to distance between said one or more additional interim images and said principal interim image, and optionally wherein said measure related to distance comprises: one of: a sum of squares distance, a Kullback-Leibler measure of distance, any norm as a measure of distance, or another appropriate cross-likelihood measure correlated to distance.

5. A method of creating an image according claim 1, wherein said processing with noise compensation corresponds to a regularised iterative update derived from any regularised iterative image reconstruction algorithm using said measured dataset.

6. A non-transitory computer program product operable, when executed on a computer, to perform the method of claim 1.

7. Imaging apparatus configured to create an image representative of a measured dataset from a base image by iteratively updating a base image, said apparatus comprising:

dataset generation processing logic configured to use said measured dataset as a principal dataset or generate a principal dataset from said measured dataset by generating a bootstrapped dataset from said measured dataset, said dataset generation processing logic being further configured to generate at least one additional different dataset from said measured dataset, said additional different dataset comprising: a dataset generated from said measured dataset such that each additional different dataset has noise at substantially the same level as said measured dataset and such that each additional different dataset is not identical to the principal dataset by creating one or more bootstrapped datasets sampled from said measured dataset;

processing logic configured to process the base image without noise compensation using said principal dataset to obtain a principal interim image and to process the base image without noise compensation using each additional dataset to obtain a at least one additional interim image;

comparison processing logic configured to compare said principal interim image and at least one additional interim image to determine an indication of a level of noise present; and image creation processing logic configured to use said determined indication of noise to select a level of noise compensation to apply when processing the base image using said measured dataset to create a new base image representative of said measured dataset;

wherein parameters of said noise compensation are modified to cause a greater level of noise compensation than that found by an optimization procedure of the objective function in order to slow down iterative updates of said base image and avoid accumulation of residual noise and in which continued iterative updates are such that said parameters of said noise compensation implemented are selected to be increasingly close to said parameters found by said optimization procedure of the objective function and that said parameters are selected to correspond to the greatest level of noise compensation found from all previous uses of said optimization procedure in the continued iterative updates.

* * * * *